YASUMASA SUGIHARA

McGlew & Toren
ATTORNEYS

Feb. 7, 1967 YASUMASA SUGIHARA 3,303,275

VIDEO SIGNAL REPRODUCING SYSTEM FOR COLOR TELEVISION RECEIVER

Filed Jan. 3, 1964

2 Sheets-Sheet 2

YASUMASA SUGIHARA

McGlew & Toren

ATTORNEYS.

1

2

3,303,275

VIDEO SIGNAL REPRODUCING SYSTEM FOR COLOR TELEVISION RECEIVER

Yasumasa Sugihara, Tokyo, Japan, assignor to Yaou Electric Company, Limited, Kanagawa-ken, Japan Filed Jan. 3, 1964, Ser. No. 335,566

Claims priority, application Japan, Jan. 25, 1963, 38/2,637, 38/2,638, 38/2,639

5 Claims. (Cl. 178—5.4)

This invention relates to a color television signal reproducing system and has particular reference to a color television receiver having incorporated therein a single electron gun whose emitting beam is controlled by the video information signal consisting of a luminance component and chrominance components and which is commonly known as "NTSC" signal.

It is well known that a color picture can be obtained by appropriately combining three primary colors—red, green and blue. It is also known that what may be termed color sensation can be defined by brightness, hue and saturation. These three fundamental properties exist in certain proportion to the above three primary colors. A simple system of color television would consist of a separate television transmitter and receiver for each of the primary colors and some means of optically super-imposing the three receiver outputs to obtain a color picture. Alternatively, one might transmit the red, green and blue components of the picture in such rapid succession that, to the eye, they would merge into a single color. However, both of these arrangements have the disadvantage that they are extravagant with bandwidth and furthermore do not give a picture that can be viewed on a conventional black-and-white (monochrome) television receiver. In other words, to obtain compatibility with monochrome television, it becomes necessary to transmit a signal on color reception which is identical with the video signal of a conventional monochrome television system.

Before going into detailed elucidation of the present invention, a brief account of the NTSC system with which the invention is primarily concerned will be given.

To accomplish compatibility with a monochrome television reception in accordance with the system developed by the National Television System Committee, the red, green and blue signals from their respective camera outputs are appropriately combined to produce a so-called luminance signal which represents the brightness of the picture. The ratio of combination of the three primary colors according to the NTSC is 30% of red, 59% of green and 11% of blue component. In order to transmit chromatic information of a scene, the red, green and blue camera signal outputs are also synthesized to form two chrominance signals which carry the hue and saturation detail of the picture, while the luminance signal carries the brightness information. The two chrominance signals are amplitude modulated on two subcarriers of the same frequency but with a 90° phase difference. In this manner, a combined amplitude of these subcarriers denotes the saturation while the phase variation thereof represents the hue information of the picture. Thus, the information representative of a scene as a whole is utilized to develop two substantially simultaneous signals on the receiver, the one representing the brightness and the other representing the chromaticity of the image. The latter signal is a subcarrier wave signal the frequency of which is within the band width of the brightness signal. This subcarrier wave signal has successive cycles each modulated in phase by signal components representative of primary colors or hues so that the cycles have substantially the same phase-hue characteristic. In such subcarrier wave signal the successive cycles are also modulated in amplitude by signal components representative of the color saturation of successive elemental areas of the televised color image. The composite video-frequency signal comprising the brightness signal and the modulated subcarrier wave signal is one developed by the National Television System Committee (NTSC) for the translation of information representative of the color of the televised image, and will be referred to hereinafter as the NTSC signal. This composite signal is utilized to modulate a conventional radio-frequency carrier wave signal.

A receiver in such system intercepts the radio-frequency signal and derives the NTSC signal therefrom. One type of such receiver includes a pair of principal channels for applying the brightness and chrominance information to an image-reproducing device therein. The channel for translating the brightness signal is substantially the same as the video-frequency amplifier portion of a conventional monochrome receiver. The chrominance signal is translated through the second of such channels and three color-signal components individually representative of the three primary hues or colors red, green, and blue of the image are derived therefrom and are combined with the brightness signal in the image-reproducing device to effect reproduction of the televised image.

One of the image reproduction systems of the type discussed above is embodied in the so-called Chromatron tube, or other picture tubes of the type having a single electron gun. A composite video signal according to the NTSC system includes both luminance and chrominance information signals substantially simultaneously. Therefore, these signals are subjected to sampling thereby to translate them into dot sequences or line sequences, as the case may be. This color conversion is carried out in a Chromatron tube having a single-unit electron gun. Color switching signal voltages are applied to the color grids of the tube so as to switch the electron beam in the sequence: red, green, blue, green, red, blue, etc., while the electron gun is synchronized with the same sequence. The fluorescent screen of the Chromatron tube consists of very narrow strips of color phosphors arranged in the sequence: red, green, blue, green, red, green, etc., and further consists of control grids accurately aligned inside of and opposite the color strips. To the control grid structure is applied a color switching signal thereby selecting the color for reproduction. Thus, a single electron beam directed toward the grid can be made to strike a red, green or blue phosphor strip as desired by controlling the voltage difference between the two sets of grids. If no voltage difference exists between the grids, all incoming electrons are deflected so that they hit green strips irrespective of their initial position. Applying a voltage of a certain polarity between the two sets of control grids will result in the deflection of the beam toward red or blue strips. It follows that a color picture is obtained by applying the color switching signal to the control grid structure through a transformer.

A process has been known in which a color television signal is received in a picture tube such as Chromatron, whereupon a sinusoidal wave voltage of color subcarrier frequency is impressed on the color control grids so as to deflect the beam. In such process, the electron beam is controlled by applying a color television signal, after detection, to the first grid through a gate circuit. Alternatively, the gate signal is applied to the cathode of the picture tube, or is applied to the first grid and then detected on the tube. Both of these arrangements have the disadvantage that the electron beam cannot be fully utilized because the beam is subjected to gating by a color subcarrier frequency or its harmonics and, hence, the brightness tends to decline. They have the further disadvantage that the harmonic power of the color subcarrier applied to the color control grid is extremely high with the result that undesirable radiation takes place to interfere with other communication equipment or color receivers near at hand.

An object of the present invention is to provide a novel color televised-image reproducing means having adapted thereto a single electron gun type picture tube which will eliminate the above noted difficulties encountered with the conventional NTSC system.

Another object of the invention is to provide a color television signal reproducing system wherein a voltage of stepped-form having a frequency of ⅓ of the horizontal scanning frequency is used in lieu of the voltage of a color subcarrier hitherto used as a color switching signal, whereby a high rate of brightness and resolution of the picture is obtainable.

A further object of the invention is to provide improved means for the production of a brighter, more clear-cut color picture and for easier operation of the color television receiver, by defining the voltage of the color control grid to have a frequency which is ⅓ of the horizontal scanning frequency, and thus increasing the utilization of the electron beam.

Still a further object of the invention is to provide improvements in the NTSC system wherein a single color demodulation circuit is adapted to derive a color-difference signal of line sequence thereby facilitating and stabilizing the circuit operation.

The invention will be described in its embodiment utilizing a picture tube of the type having a single electron gun, such as known, for example, as a Chromatron tube or a similarly operating cathode ray tube, for image reproduction. As previously stated, the fluorescent screen of this picture tube consists of a number of very narrow strips of color phosphors, each strip being adapted to produce one primary color upon contact with an electron beam, and all strips are of either one of the three primary colors, red, green and blue, and these strips are regularly arranged and coated on the screen face. Immediately in front of this fluorescent screen is a grid structure consisting of electrically conductive wires accurately aligned in parallel with the color strips, the wires being insulated from adjoining wires but with alternate wires being electrically connected with each other so that two sets of grid members are provided. These are called color control grids. This grid structure is adapted to deflect the beam selectively so that it will strike a selection of the color strips.

The electron beam emitted from the gun is deflected both in vertical and horizontal directions in the presence of magnetic or electric fields before the beam arrives at the color control grids, so that the raster to be reproduced is formed with its brightness controlled by the voltage between the cathode of the gun and the first grid, as is the case with a conventional black-and-white picture tube.

As aforementioned, the inventive concept of this invention resides in the fact that a voltage of stepped-form having a frequency of ⅓ of the horizontal scanning frequency is used instead of the voltage of the color subcarrier conventionally applied as a color switching signal.

The invention will now be described in more detail in connection with reference to the accompanying drawings in which:

FIG. 1 illustrates a general circuit arrangement of the invention;

FIG. 2 schematically illustrates waveforms of input and output signals of a ring counter;

Figure 1:
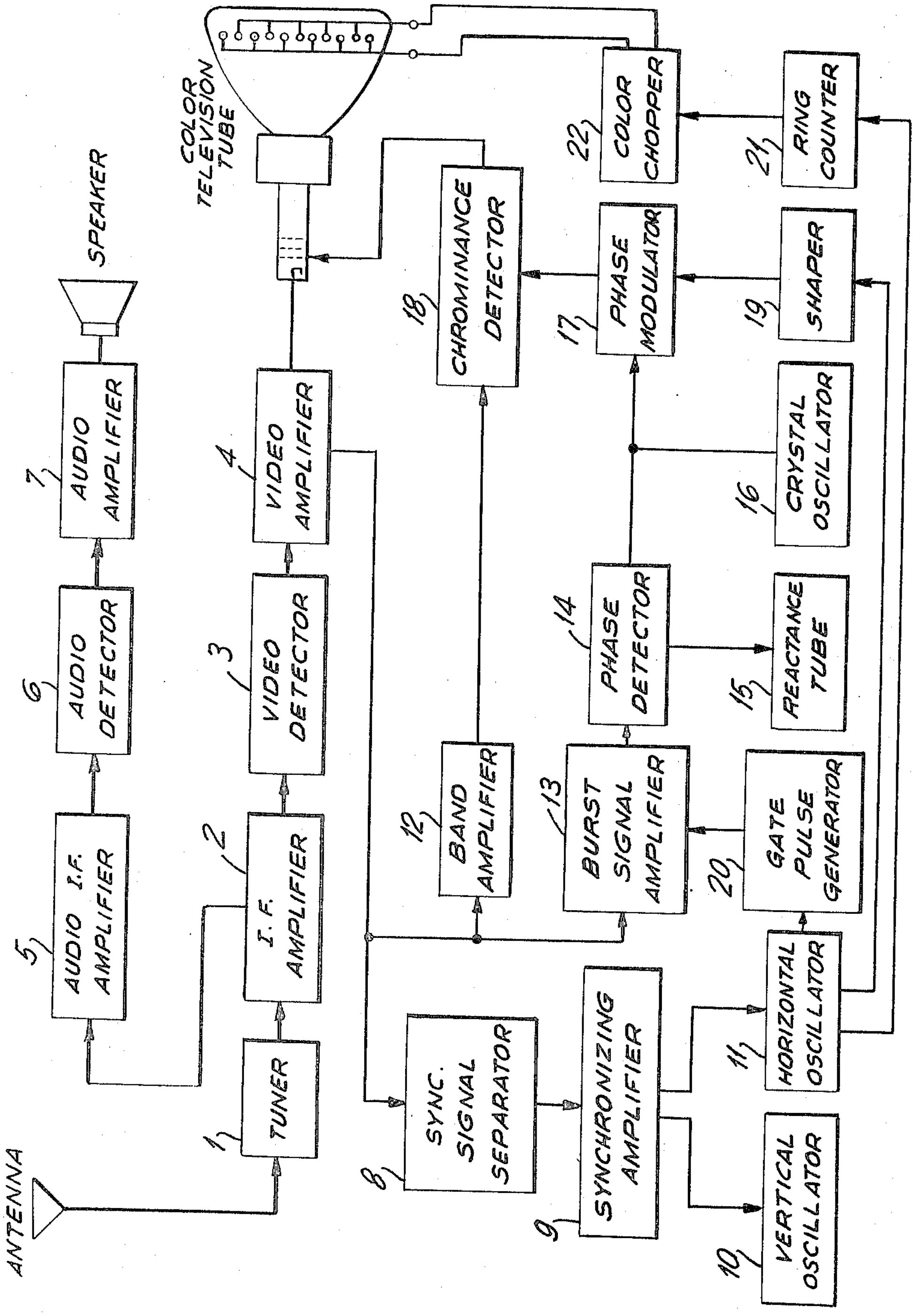

An intermediate frequency amplifier 2 is connected to the output of tuner 1, and the output of amplifier 2 is connected to the input of a video detector 3 whose output is connected to a video amplifier 4. The output of video amplifier 4 is applied to the cathode of a television tube CRT. The output of intermediate frequency amplifier 2 is also connected to an audio intermediate frequency amplifier 5 whose output is connected, through an audio detector 6, to an audio amplifier 7 having its output connected to a loud speaker SP. A sync signal separator 8 is connected to video amplifier 4 and a synchronous amplifier 9 has its input connected to the output of sync separator 8. A vertical modulator and deflection output circuit 10, and a horizontal oscillator and deflection output circuit 11, are connected in parallel to the output of synchronous amplifier 9. These component circuits operate in a manner substantially similar to those built in a black-and-white receiver. Parts designated by 12 through 22, inclusive, are circuits designed to reproduce a color televised image in accordance with the invention.

Figure 2:
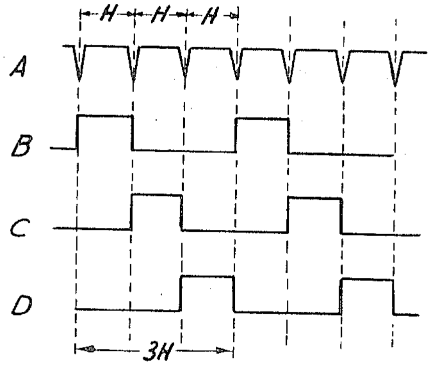
Figure 3:
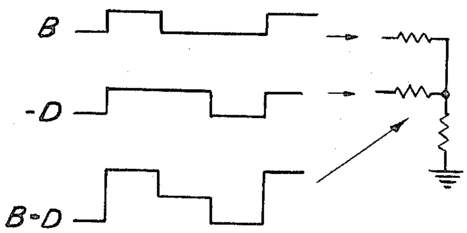
FIG. 3 illustrates a matrix circuit adapted to combine stepped-waveform voltages applied to the color control grids.
Figure 4:
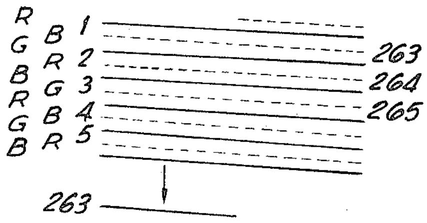
FIG. 4 illustrates an example of a color arrangement on each scanning line constituting a raster.

A ring counter circuit 21 as shown in FIG. 2 is adapted to be driven by horizontal pulses A having a horizontal scanning cycle H, and produces wave forms B, C and D shifted successively by one horizontal scanning cycle H, the output wave forms having a polarity reversed with respect to the pulses A. Waveforms B and D, when combined in reverse polarity at a resistance matrix circuit, will produce a stepped-wave-form B–D as illustrated in FIG. 3. The stepped-waveform thus formed is amplified at 22 and applied to the color control grids, whereupon it will switch the three primary colors between red, green and blue in sequence during an interval of each horizontal scanning period. Thus, reproduction of a set of red, green and blue colors is completed during three cycles of horizontal scanning. An example of color sequence per scanning line is given in FIG. 4, from which it will be appreciated that color information, containing white color, can be reproduced, and which is natural to the eye. The luminance signal commonly identified by the symbol Y is introduced through the video amplifier 4 and applied to the cathode of the picture tube, while color-difference signals R–Y, G–Y and B–Y are applied in sequence to the first grid. As the color control grids, as previously stated, are switched in the horizontal line sequence, so that color-difference signals are applied in the same sequence and at the same cycle to the first grid. In such instance, some means must be provided for the preparation of appropriate color-difference signals arranged in the line sequence: R–Y, G–Y, B–Y, etc.

The present invention offers an improved means for such color-difference signal production. This means consists primarily of a band amplifier 12 adapted to selectively amplify the chrominance signals, a burst signal amplifier 13 adapted to derive burst signals from a composite video signal, a phase detector 14, a reactance tube 15 and a crystal oscillator 16, reactance tube 15 being adapted to control the oscillating frequency of the crystal oscillator 16. It may be noted that the phase detector 14, reactance tube 15 and crystal oscillator 16 are connected in a loop fashion.

The band amplifier 12 consists of a two-stage tuning amplifier having a band width of 3.58 megacycles with ±0.5 mc. and adapted to pick the chrominance signals out of the input video signal and supply them to a chrominance detector 18. From the second stage of the band amplifier 12, there is obtained a burst signal which is fed to the burst amplifier 13 gated by a 3H (H: horizontal scanning cycle) cycle gate pulse, thereby producing a subcarrier synchronizing signal. This signal is supplied to an APC circuit phase detector. The gate pulse of 3H cycle just mentioned may be easily obtained by differentiating the corrector waveform of a color chopping circuit 22 through a C–R circuit (capacitor-resistance coupling). The crystal oscillator 16 oscillates at a frequency of $H/3$ lower than the subcarrier frequency or at 3.574295 megacycles which is in phase with the synchronizing signal of 3.579545 megacycles at every 3 horizontal scanning cycles and is synchronized by the APC circuit with the burst signal. The output of this oscillator is introduced into a phase-modulator 17 where it is modulated 120° in phase by a sawtooth wave which is obtained by integrating the horizontal pulses A. The oscillator output thus phase-modulated is supplied to an amplitude limiter and then applied as a subcarrier to the chrominance detector 18. In this manner, the input signal from the band amplifier 12 will detect color-difference signals in the sequence of B–Y, R–Y and G–Y, and is amplified and applied to the cathode ray tube to produce a color picture.

On the other hand, a color-switching signal is produced by the horizontal synchronizing signal through the ring counter 21. The waveform of this color-switching signal is depicted in FIG. 3. This signal is applied to the color-switching electrode of the cathode ray tube so that the electron beam emitted by the gun is deflected thereby to produce a color picture corresponding to the color-difference signals applied to the color grids. Thus, there may be obtained a chromatic image formed in the line sequence, as desired, on a fluorescent screen of the cathode ray tube having a single electron gun.

In known color television receivers, the crystal oscillator is designed usually to oscillate at a color subcarrier frequency ($fsc$). However, in accordance with the invention, a crystal oscillation is employed which may be defined by the formula:

$$fsc+fH/3, \text{ or } fsc-fH/3$$

where $f$H denotes a horizontal scanning frequency.

The above formula will be further accounted for in order that the entire process for the completion of a color picture according to the invention may be better appreciated.

Figure 5:
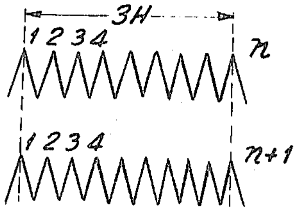
FIG. 5 illustrates the phase relation between a crystal oscillator output and a color subcarrier.
Figure 6:
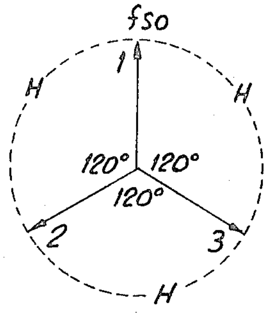
FIG. 6 is a vector diagram illustrating a relation similar to that of FIG. 5.

The relation of $fsc$ and $fsc+fH/3$, as illustrated in FIG. 5, implies that there will be produced a difference of one cycle during the $3/fH=3H$ period (here, H denotes a cycle of horizontal scanning). It follows that there will be produced a phase difference of 120° during each H cycle, as may be apparent from the vector diagram of FIG. 6. This difference by phase angle nearly agrees with the axis of detection of R–Y, G–Y, B–Y, and is well known as such in a single electron gun type color television receiver.

However, inasmuch as the value $fsc+fH/3$ represents a successive phase variation of 360° during the 3H period as against the value $fsc$, it will be appreciated that, if such value is used, as it is, as a detection axis, the color will change in sequence from left to right within one scanning line. To avoid this, it is necessary to fix the phase at every scanning line period. This is accomplished by the phase modulation circuit 17 illustrated in FIG. 1.

Figure 7:
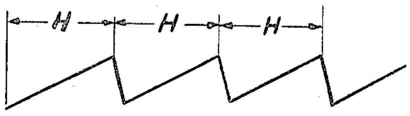
FIG. 7 schematically illustrates a waveform adapted for phase-modulation.

The phase modulating waveform is, as illustrated in FIG. 7, a sawtooth wave of horizontal scanning frequency H which may be easily obtained from a horizontal deflection output circuit. The sawtooth wave is shaped by a shaping circuit designated at 19 in the general circuit layout of FIG. 1. A proper selection of the amplitude and polarity of this waveform makes it possible to define the phase of the $fsc+fH/c$ carrier in a stepped-fashion relative to the $fsc$ phase, as shown at 1, 2 and 3 in FIG. 6. The cycle of each of these steps corresponds to one horizontal scanning period. This phase modulation takes place for about one radian, hence any conventional modulation method may be used therefor.

Thus, the signal $fsc+fH/3$ phase-modulated by the above defined sawtooth wave may be applied to a demodulator 18 with the result that color-difference signals are produced in the line sequence: R–Y, G–Y, and B–Y, as desired. With these color-difference signals applied to the first grid, a clear and bright color picture may be reproduced.

Similar results may be obtained also with the oscillation mode $fsc-fH/3$, in which case the color grid switching sequence should be adjusted accordingly.

In FIG. 1, the reference numeral 20 designates a circuit for generating a gate pulse of $fH/3$ which is intended to maintain a stable operation of the automatic phase control circuit for the crystal oscillator by sampling a burst signal at every 3H cycles.

It will be appreciated that in lieu of the ring counter circuit 21, the $fH/3$ gate pulse generator 20 may be used to produce a suitable sawtooth wave which may be applied to the color control grids after passing through the color chopper 22. In this way, the color switching may be effected with the sawtooth wave as desired. In this alternative process, all the rest of the circuits remain the same as above described.

Having described the principal circuit concept of this invention, it will be understood that a brighter color television picture may be obtainable with ease by the color television receiver of the invention, which is so devised as to permit the use of a voltage at ⅓ of the horizontal scanning frequency for application to the color control grids and, at the same time, to provide an increase in the availability of an electron beam emitted by a single electron gun.

Another advantage of the present invention lies in the use of a single color demodulation circuit capable of producing color-difference signals in the line sequence, thereby contributing greatly to the stabilzation and simplification of the circuit operation.

While I have shown a particular embodiment of my invention and described a particular process and circuit concept, it will, of course, be understood that I do not wish to be limited thereto, since many modifications or changes may be made as obvious to those skilled in the art and I, therefore, contemplate by the appended claims to cover all such modifications as fall within the true spirit and scope of my invention.

What I claim is:

1. In a color television receiver utilizing composite video signals of the color sub-carrier type including a luminance component and two chrominance components, the combination comprising: a color picture tube including a single electron gun, a screen in the path of electron beams from said gun and a color switching grid operable to switch the sequence of impingement of electron beams upon said screen; means operable to apply, to said color switching grid, a color switching voltage having a cycle equal to three horizontal scanning cycles; means generating a frequency differing from the sub-carrier frequency by ⅓ of the horizontal scanning frequency; means deriving color burst signals from the composite video frequency; means applying said color burst signals to said generated frequency to phase the latter; means generating a sawtooth wave form having a cycle equal to the horizontal scanning cycle; means phase-modulating said phased generated frequency with said sawtooth wave form; a demodulator connected to said color picture tube; means applying said chrominance components to said demodulator; and means applying the phase-modulated generated frequency to said demodulator to demodulate said chrominance components to obtain color signal information of the line-sequential type.

2. In a color television receiver, the combination claimed in claim 1, in which said generated frequency is higher than the sub-carrier frequency.

3. In a color television receiver, the combination claimed in claim 1, in which said generated frequency is lower than said sub-carrier frequency.

4. In a color television receiver, the combination claimed in claim 1, in which said frequency generating means is a crystal controlled oscillator.

5. In a color televison receiver, the combination claimed in claim 1, in which said means generating a sawtooth wave form is a gate pulse generator.

References Cited by the Examiner

UNITED STATES PATENTS

| | | | |
|---|---|---|---|
| 2,965,704 | 12/1960 | Schagen ----------- | 178—5.4 |
| 3,033,920 | 5/1962 | Fedde et al. -------- | 178—5.4 |
| 3,035,116 | 5/1962 | Raibourn ---------- | 178—5.4 |

DAVID G. REDINBAUGH, *Primary Examiner.*

J. A. O'BRIEN, *Assistant Examiner.*